J. R. WHITNEY.
Sulky-Plow.

No. 212,341. Patented Feb. 18, 1879.

UNITED STATES PATENT OFFICE.

JAMES R. WHITNEY, OF MAGNOLIA, WISCONSIN.

IMPROVEMENT IN SULKY-PLOWS.

Specification forming part of Letters Patent No. 212,341, dated February 18, 1879; application filed October 23, 1877.

*To all whom it may concern:*

Be it known that I, JAMES R. WHITNEY, of Magnolia, in the county of Rock and State of Wisconsin, have invented a new and useful Improvement in Sulky-Plows, which improvement is fully set forth in the following specification and accompanying drawings, in which—

Figure 1:
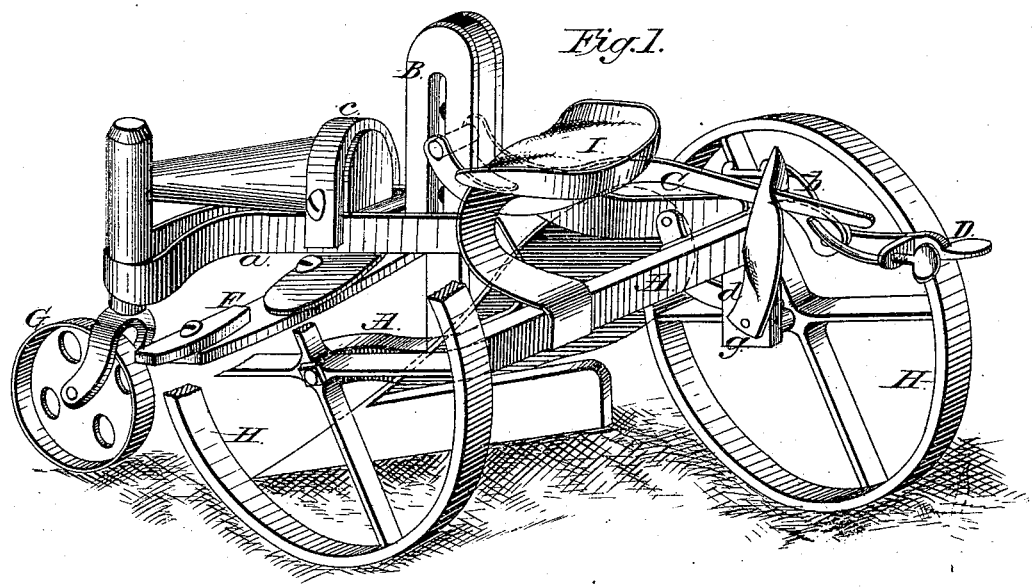
Figure 2:
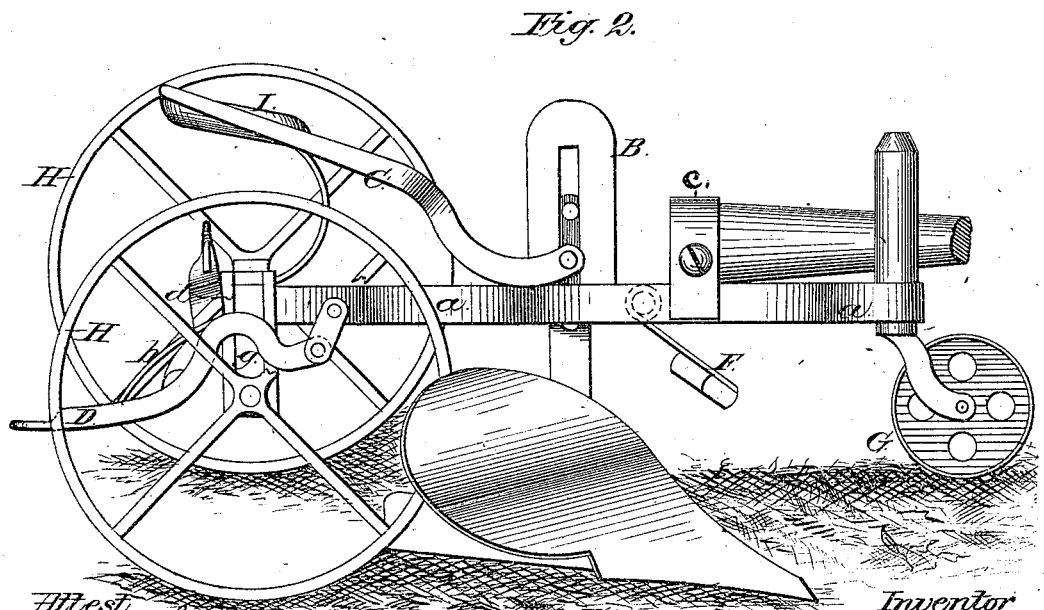

Figure 1 is a rear perspective view of my machine. Fig. 2 is a side view of the same, showing the plowshare with its vertical shank.

The object of my invention is to furnish a sulky-plow that is easy of draft and compact, and to place the plow in front of the furrow-wheel, in close proximity to it, and in full view of the driver, and the draft immediately in front and close to the plow-standard, which may be easily raised and lowered and operated by the driver at will. This I accomplish by the use of an ordinary steel plowshare, with its shank standing perpendicular and extending up through a standard-socket, which rests upon the plow-beam and is firmly bolted thereto, through which the shank works in raising and lowering the plowshare by means of a bifurcated cam-lever pivoted to said shank.

The said plow-beam is made by two bars of iron running parallel and standing edgewise, and at such distance apart as to leave a sufficient space corresponding with the thickness of the shank, and for it to pass through.

In the drawings, A is the axle, with a drop near the left wheel. $a\ a$ are bars forming the beam. B is a standard-socket, for the purpose of holding the shank of the plow. C is a curved bifurcated lever, for raising the plow out of the ground. D is a hand-lever, working in a ratchet, for the purpose of adjusting the axle and beam to a proper level, so as to allow the right wheel to drop into the furrow behind the plowshare and follow it, the axle and beam maintaining a level position. This is done by the arm $g$ of the axle being loosely attached to the main axle, which is held by the upright grooved plate $d$, the said axle-arm sliding up and down in said grooved plate, which also forms the ratchet.

$b$ is a spring-catch to hold the lever C. $c$ is a perforated loop, standing upright upon the beams forward of the standard-socket, to hold the rear end of the tongue. F is the evener, with single-trees attached to each end, located under the beams and forward of the plow. The forward end of the beams or double beam is carried by a caster-wheel, G. H H are the main wheels. I is the driver's seat, with spring-pedestal resting on axle A.

It will be seen from the foregoing that the machine, as herein described, which is to be made of iron, except the spokes, fellies, whiffletrees and pole, is a compact, strong, and simple piece of mechanism for the purpose intended. The plow, running immediately in front of the right wheel and held by the upright shank in the standard-socket, can be gaged to the desired depth, and the nether friction relieved by being carried by the wheels and beam.

The plow being in a position that enables the driver to keep watch of his work and his team at the same time without turning his head, has been found to be the most convenient instrument of the kind in use.

The main wheels H H are about forty inches, and the caster-wheel sixteen inches, in diameter. All of these wheels have a clear track, as the right large wheel runs in the furrow behind the plow, and the left and the caster wheel run upon the unplowed land. A foot-rest for the driver is to be arranged as shall be found most convenient.

Having thus described my invention, what I claim as new, and desire to secure by Letters Patent, is—

The combination, in a sulky-plow, of the beam formed of two bars, $a\ a$, standing edgewise, having the rear ends bolted to the axle and their forward ends curved, as shown, the standard-socket B, arranged between and bolted to said bars, and the shank of the plow adjustable vertically in said socket, all constructed and operating as described.

JAMES R. WHITNEY.

Witnesses:
WILLIAM SMITH,
S. HENRY HUDSON.